3,706,528
MODIFYING KERATINOUS TEXTILES AND FIBRES WITH MERCAPTAN POLYESTERS
Bryan Dobinson, Duxford, Paul Hope, Great Shelford, and Kenneth Winterbottom, Whittlesford, England, assignors to Ciba-Geigy AG, Basel, Switzerland
No Drawing. Filed Dec. 2, 1970, Ser. No. 94,553
Claims priority, application Great Britain, Dec. 5, 1969, 59,661/69
Int. Cl. D06m 3/02
U.S. Cl. 8—128 A    7 Claims

ABSTRACT OF THE DISCLOSURE

A process for modifying textiles and fibres of keratinous material, in particular a process for rendering the material resistant to shrinkage and for imparting durable press characteristics to the material is provided. This process comprises treating the material with an ester containing at least two mercaptan groups per molecule, obtainable by reaction of a monomercaptodicarboxylic acid or its anhydride, a substance containing at least two alcoholic hydroxyl groups or one 1,2-epoxide group, and, optionally a substance containing at least one mercaptan group; and curing the ester on the material.

---

This invention relates to a process for modifying textiles and fibres, especially textiles and fibres of keratinous material, and, in particular, to a process for rendering the material resistant to shrinkage and to a process for imparting durable press characteristics to the material.

A number of shrink-resist processes for keratinous material are known, some of which comprise the application of a resin to the material which may be in fabric or fibre form. Shrink-resist processes stabilize the dimensions of keratinous materials against shrinkage due to felting.

Durable press processes for keratinous material are also known and many of them employ resins the same or similar to those used in shrink-resistant processes. In some durable press processes the deired shape is imparted to the keratinous material before the resin is cured and then curing is allowed to take place whilst the material is maintained in the desired shape, e.g. in form of creases or pleats. In others the resin is applied after the desired shape is imparted to the material. Durable press processes stabilize the shape and surface smoothness of the material against the effects of agitation in the presence of aqueous solutions. The desired shape may be imparted to the material before or after resin treatment by well known methods involving the use of setting agents such as steam, reducing agents, and bases.

A desirable, though not essential, feature of shrink-resist and durable press processes is that the keratinous material so treated should be washable in domestic washing machines. To be machine-washable the finish on the treated material should withstand vigorous agitation in warm or hot water containing detergents, and this requirement sets a severe test for the durable press and shrink-resist treatments.

We have now found that certain esters containing mercaptan (—SH) groups can be used successfully in durable press and shrink-resist processes without imparting an unattractive handle to the treated material. These esters cure, i.e. undergo reaction or are "fixed," on the keratinous fibre, apparently through their mercaptan groups, and we have further found that the rate of curing may be largely controlled by selection of the appropriate catalyst.

Accordingly, the present invention provides a process for modifying keratinous material which comprises (1) Treating the material with an ester containing at least two mercaptan (—SH) groups per molecule, obtainable by reaction of (a) a monomercaptodicarboxylic acid, or its anhydride,
(b) a substance containing at least two alcoholic hydroxyl groups or one 1,2-epoxide groups, and, optionally,
(c) a substance containing at least one mercaptan group which is a monocarboxylic acid or a monohydric alcohol, and (2) Curing the ester on the material.

The invention also provides keratinous material bearing thereon an ester as aforesaid, in the cured or still curable state.

The treatment according to the invention, whether to achieve shrink-resist or durable press effects, provides fibres or garments which will withstand washing in machines and retain their original dimension and shape. The treated material also has good recovery from wrinkling, which is an important attribute in fabrics employed in trousers, where there is a strong tendency to wrinkles in the areas of the knee and back of the knee. Of course, wrinkle-resistance is an important advantage in many garments.

The polymercaptan esters used in the process according to the invention, as well as inhibiting or preventing felting shrinkage, also inhibit or prevent relaxation shrinkage, which is an important problem associated with knitted goods.

The term "keratinous material" as used throughout this specification includes all forms of keratinous fibres or fabrics and garments made therefrom, e.g. fleeces, tops, card sliver, noils, yarns, threads, pile fabrics, non-woven fabrics, woven fabrics, and knitted goods. In most cases the treatment will be applied to fabrics or made-up garments though it is quite feasible, and may be desirable in some circumstances, to shrink-resist fibres, e.g. in the form of tops. The material to be treated can consist either wholly of keratinous fibres or of blends of these fibres with synthetic fibrous and filamentary material such as polyamides, polyesters, and poly(acrylonitrile), and with cellulosic and regenerated cellulosic material. In general, however, the material should contain at least 30% by weight of keratinous fibres and best results are obtained with substantially 100% keratinous fibre-containing material.

The keratinous material may be virgin or reclaimed: preferably, though not necessarily, it is sheep's wool. It may also be derived from alpaca, cashmere, mohair, vicuna, guanaco, camel hair, and llama, or blends of these materials with sheep's wool.

Preferred polymercaptans for use in the process according to the invention are those esters having an average molecular weight of between 400 and 40,000.

Such esters may be those obtainable by the esterification of (a) a monomercaptodicarboxylic acid with
(d) a compound containing at least two but not more than six alcoholic hydroxyl groups per molecule and, optionally, (e) a dicarboxylic acid containing no mercaptan group, or an anhydride of such an acid, or (f) a monocarboxylic acid, preferably a monomercaptomonocarboxylic acid, or (g) a monohydric alcohol, preferably a monomercaptomonohydric alcohol.

If desired, mercaptan-free compounds containing three or more carboxylic acid groups, or anhydrides thereof, can be incorporated. As those skilled in the art of making polyesters will appreciate, however, the quantity employed of such an acid should not be such that gelation occurs.

The monomercaptodicarboxylic acid (a) is usually of formula $$\text{HOOC} - \underset{\underset{\text{SH}}{|}}{\text{R}} - \text{COOH}$$

where R represents a trivalent aliphatic or alicyclic radical, the indicated carboxyl groups and mercaptan groups being directly linked to a carbon atom or carbon atoms of the group R, and preferably it is thiomalic acid, $$\text{HOOCCH}_2\text{CH(SH)COOH}$$

otherwise known as mercaptosuccinic acid, but other such acids which may be used include 4-mercaptoendomethylenecyclohexane-1,2-dicarboxylic acids of formula where one $R^1$ denotes a hydrogen atom or a methyl group, and the other $R^1$ substituents each represent a hydrogen atom, 2-mercaptoadipic acid, 2-mercaptosebacic acid, and 2-mercaptopimelic acid. The group R may, therefore, be further defined as saturated aliphatic and saturated cycloaliphatic of at most 8 carbon atoms.

The substances containing at least two alcoholic hydroxyl groups (b, d) include ethylene glycol, propylene glycol, propane-1,3-diol, butane-1,2-diol, butane-1,3-diol, butane-1,4-diol, poly(oxyethylene) glycols, poly(oxypropylene) glycols, poly(oxybutylene) glycols, poly(oxy-1,1-dimethylethylene) glycols, poly(epichlorohydrins), glycerol, 1,1,1-trimethylolethane, 1,1,1-trimethylolpropane, hexane-1,2,5-triol, hexane-1,2,6-triol, 3-hydroxymethylpentane-2,4-diol, pentaerythritol, mannitol, sorbitol, and adducts of ethylene oxide or propylene oxide with such alcohols, including mixed polyhydric polyethers obtained by treating an initiator containing active hydrogen, such as ethylene glycol, with say, propylene oxide, and then "tipping" the adduct with a second alkylene oxide, say, ethylene oxide.

Mono-1,2-epoxides which may be used in place of a dihydric alcohol include: ethylene oxide, propylene oxide, butylene oxide, 1,1-dimethylethylene oxide, and epichlorohydrin; glycidyl ethers of alcohols, such as n-butyl and iso-octyl glycidyl ethers, or of phenols, such as phenyl and p-tolyl glycidyl ethers; N-glycidyl compounds such as N-glycidyl-N-methylaniline or N-glycidyl-n-butylamine; and glycidyl esters of carboxylic acids, such as glycidyl acrylate and glycidyl acetate.

In place of trihydric and higher alcohols there may be used monoepoxymonohydric alcohols, such as glycidol, or a diepoxide such as a diglycidyl ether of an alcohol or a phenol.

The dicarboxylic acids containing no mercapto group (e) which may be used are generally of the formula $$\text{HOOC} - \text{R}^2 - \text{COOH}$$

where $R^2$ represents a divalent aliphatic, aromatic or alicyclic residue such as saturated aliphatic and saturated aliphatic interrupted by ether oxygen, and include succinic, adipic, phthalic, hexahydrophthalic, sebacic, and malic acids, and also dimerised fatty acids. Although they can be used, ethyleneically-unsaturated dicarboxylic acids are not preferred.

It is often desirable, when carrying out the preparation of a polymercaptan ester suitable for use in the process of the present invention, to add to the reaction mixture one or more monofunctional compounds, such as a monocarboxylic acid (f) or a monohydric alcohol (g), as a chain-terminator. Examples of such chain-terminators are alkanols, such as methanol, ethanol, 2-ethylhexanol, 2-methoxyethanol, monomethyl ethers of poly(oxyethylene) glycols and poly(oxypropylene)glycols, and cycloaliphatic alcohols such as cyclohexanol; aliphatic carboxylic acids such as acetic acid, 2-ethylhexanoic acid, stearic acid, and oleic acid, and aromatic acids such as benzoic acid.

As already indicated, it is especially advantageous to use as the chain-terminator a compound which contains a mercaptan group, examples being monomercaptomonocarboxylic acids and monomercaptomonohydric alcohols. Suitable monomercaptomonocarboxylic acids include thioglycollic acid, 2-mercaptopropionic acid, and 3-mercaptopropionic acid. Suitable monomercaptomonohydric alcohols include 2-mercaptoethanol and 2-mercaptopropan-1-ol.

The polymercaptan esters are, in general, known substances (see United States patent specifications Nos. 2,456,314, 2,461,920 and 2,914,585) and are prepared in a conventional manner, preferably by heating the reactants together in the presence of a strong acid (especially an anion exchange resin, toluene-p-sulphonic acid or a strong inorganic acid such as 50% sulphuric acid), and of an inert solvent, such as toluene, xylene, trichloroethylene, or tetrachloroethylene, with which water formed in the reaction can be removed as an azeotrope.

The preferred polymercaptan esters used in the process of the present invention may be represented by the general formula

I wherein a and b each represent zero or 1, with the proviso that a and b are not equal, q represents zero or an integer of from 1 to 5, p represents an integer of from 1 to 6, such that $(p+q)$ is in the range 2 to 6, When a represents zero, a group $$-\text{CO} - \underset{\underset{\text{SH}}{|}}{\text{R}} - \text{CO}-$$

or a group $-\text{CO}-\text{R}^2-\text{CO}-$ is attached to $R^4$ through the indicated oxygen atom, and when a represents one, a group $-\text{O}-\text{R}^3-\text{O}-$ is attached to $R^4$ through the indicated carboxy group, c, d, f, and g are the same or different and each represents zero or a positive integer, e represents a positive integer such that c is in the range $(d-1)$ to $(d+1)$ and f is in the range $(e+g-1)$ to $(e+g+1)$, f groups ($-\text{O}-\text{R}^3-\text{O}-$) alternate with e groups $$(-\text{CO} - \underset{\underset{\text{SH}}{|}}{\text{R}} - \text{CO})$$

and/or g groups ($-\text{CO}-\text{R}^2-\text{CO}-$), and c groups ($-\text{O}-\text{R}^3-\text{O}-$) alternate with d groups $$(-\text{CO}-\text{R}^2-\text{CO}-)$$

such that no group is directly linked to an identical group and $$(-CO-R-CO)$$
$$\phantom{(-CO-R}|$$
$$\phantom{(-CO-R-C}SH$$

groups and (—CO—R²—CO—) groups are not linked directly to each other,

R and R² are as hereinbefore defined,

R³ represents a divalent aliphatic or alicyclic residue derived from a substance containing two hydroxy groups or one 1,2-epoxy group by removal of the two hydroxy groups and the one 1,2-epoxy group respectively, Y, when attached to a group —O—R³—O—, represents a hydrogen atom or a group —CO—R⁵ and, when attached to a group $$-CO-R-CO-$$
$$\phantom{-CO-R}|$$
$$\phantom{-CO-R-C}SH$$

represents a hydroxy group or a group —O—R⁵,

Z, when attached to a group —O—R³—O, or when a, c and d each represent zero, represents a hydrogen atom or a group —CO—R⁵ and when attached to a group $$-CO-R-CO-$$
$$\phantom{-CO-R}|$$
$$\phantom{-CO-R-C}SH$$

or —CO—R²—CO—, or when b, c, and d each represent zero, Z denotes a hydroxy group or a group —OR⁵, R⁴ represents an aliphatic or alicyclic residue derived from a substance containing (p+q) hydroxy groups, or $$\left(\frac{p+q}{2}\right)$$

epoxy groups, or (p+q) carboxy groups by removal of these hydroxy, epoxy, or carboxy groups, such as saturated aliphatic and saturated aliphatic interrupted by ether oxygen, and R⁵ represents an alkyl, aryl, or cycloalkyl group, which may be substituted by mercaptan and/or alkoxy groups, with the proviso that when e and p each represent one, then (i) Y and/or Z contain the group R⁵, and
(ii) R⁵ contains at least one mercaptan group.

It should be understood that the various groups attached to R⁴ within the same molecule may be the same or different.

More specifically, the preferred polymercaptan esters conform to the General Formula II $$\left[\begin{array}{c}-(O-R^3-O)_c-\\ -(O)_b-(CO)_a-\\ -(CO-R^2-CO)_d-\end{array}\right]_q \left[-R^4-\right] \left[\begin{array}{c}-(CO)_a-(O)_b-(O-R^3-O)_f-\\ \left(\begin{array}{c}SH\ H\\ |\ \ |\\ -COCH-CH-CO\end{array}\right)_e\\ -(CO-R^2-CO)_g-\end{array}\right]_p \quad \text{II}$$

Z— ... —Y wherein R², R³, R⁴, Y, Z, a, b, c, d, e, f, g, p, and q are as hereinbefore defined; more especially preferred are compounds of the General Formula II wherein, a, q, and g each represent zero, and R⁴ is derived from a substance containing two hydroxy groups or one 1,2-epoxy group by removal of the two hydroxy groups or of the one 1,2-epoxy group and therefore covers the same class of groups as is covered by R³, i.e. the compounds of General Formula III $$\left[R^3-\left[-O-\left(\begin{array}{c}-(CO-CH-CH-CO)-\\ |\ \ \ \ \ |\\ SH\ \ H\end{array}\right)_e-(O-R^3-O)_f-\right]-Y\right]_2 \quad \text{III}$$

It will be understood that Formulae I to III represent the average structure of the esters. Because of incomplete esterification, other substances may also be present. Further, as already indicated, not all units designated R, R², and R³ need be the same. If desired, two or more monomercaptodicarboxylic acids, polyhydric alcohols, or dicarboxylic acids may be used, so that successive R, R², and R³ units may be different.

The polymercaptans may be used alone or in association with other resins or with resin-forming substances, such as aminoplasts, other polymercaptans, epoxy resins (i.e. substances containing on average more than one 1,2-epoxide group per molecule), acrylic resins, including polymers and copolymers of acrylate esters, e.g. ethyl, n-butyl and 2-hydroxyethyl acrylates, and acrylamide, or polyisocyanates, including prepolymers of a polyoxyalkylene glycol and an aromatic diisocyanate or of a polyoxyalkylene) triol and an aliphatic diisocyanate.

Examples of other polymercaptans which may be used in association with those employed in the process of this invention are those of the formulae $$\left[R^6\!\!\left\langle\begin{array}{c}-[OH]_x\\ -[O.OC.C_uH_{2u}SH]_w\end{array}\right.\right]$$

and $$\left[R^6\!\!\left\langle\begin{array}{c}-[(O\text{-alkylene})_s\text{-}OH]_x\\ -[(O\text{-alkylene})_s\text{-}O.CO.C_uH_{2u}SH]_w\end{array}\right.\right] \quad \text{IV}$$

in which

R⁶ represents an aliphatic radical containing at least two carbon atoms, preferably an aliphatic hydrocarbon radical containing not more than six carbon atoms, w denotes an integer of at least 2 and at most 6, x denotes zero or a positive integer such that (w+x) is at most 6, u denotes a positive integer of at most 2, Each "alkylene" group contains a chain of at least 2 and at most 6 carbon atoms between the indicated consecutive oxygen atoms, and s denotes an integer, which may have different values in each chain, such that the molecular weight of the ester is at least 400 and at most 10,000.

Many of the polymercaptans are insoluble in water but can be applied as aqueous dispersions or emulsions. Preferably they are applied to fabrics and garments from organic solvents, for example alcohols, lower ketones such as ethyl methyl ketone, benzene, and halogenated hydrocarbon solvents, especially chlorinated and/or fluorinated hydrocarbons contaianing not more than three carbon atoms such as the dry cleaning solvents, carbon tetrachloride, trichloroethylene, and perchloroethylene.

Aqueous emulsions which are convenient vehicles for applying the polymercaptans used in the process of this invention comprise:

(i) a polymercaptan ester as aforesaid
(ii) an emulsifying agent and, optionally, (iii) a protective colloid such as sodium carboxymethylcellulose or methyl vinyl ether homopolymers or copolymers with e.g., maleic anhydride.

The amount of polymercaptan used depends on the effect desired. For most purposes from 0.5 to 15% by weight based on the material treated is preferred. Stabilization of knitted fabrics usually requires from 1 to 10% by weight of the resin. A high level of shrink-resistance, crease-setting and substantial resistance to wrinkling can be achieved on woven fabrics with rather smaller quantities, especially from 1 to 5% by weight. The "hand" or "handle" of the treated material will, of course, depend on the amount of polymercaptan employed and by simple experiment the least amount of the polymercaptan required to give the desired effect may readily be determined. Further, the construction of the fabric may also influence the amount of polymercaptan required.

The desired effects are not fully obtainable until the polymercaptan on the material has substantially cured. At ordinary temperatures this may take from five to ten days or even longer. The curing reaction can, however, be accelerated greatly by the use of a catalyst, and generally it is preferred to add the catalyst to the material to be treated at the same time as the polymercaptan is applied although it may be added before or afterwards if desired. The curing time can be controlled by selecting an appropriate catalyst and the choice of curing time will depend on the particular application of the process according to the invention. The catalysts may be organic or inorganic bases, siccatives, oxidative curing agents, and free-radical catalysts such as azodi-isobutyronitrile, peroxides and hydroperoxides, or combinations of these. As organic bases there may be used primary or secondary amines, especially the lower alkanolamines, e.g. mono- and diethanolamine, and lower polyamines, e.g. ethylenediamine, diethylenetriamine, triethylenetetramine, tetraethylenepentamine, propane-1,2-diamine, propane-1,3-diamine, and hexamethylenediamine. As inorganic bases there may be used the water-soluble oxides and hydroxides, e.g. sodium hydroxide, and also ammonia. Examples of suitable siccatives are calcium, copper, iron, lead, cerim, and cobalt naphthenates. Examples of peroxides and hydroperoxides which may be used are cumene hydroperoxide, tert.-butyl hydroperoxide, dicumyl peroxide, dioctanoyl peroxide, dilauryl peroxide, ethyl methyl ketone peroxide, diisopropyl peroxydicarbonate, hydrogen peroxide, and chlorobenzoyl peroxide.

Other types of catalysts include sulphur, and sulphur-containing organic compounds in which the sulphur is not exclusively present in mercaptan groups, namely, mercaptobenzothiazoles or derivatives thereof, dithiocarbamates, thiuram sulphides, thioureas, dialkyl, dicycloalkyl or diaralkyl disulphides, alkyl xanthogen disulphides, and alkyl xanthates.

Yet other catalysts are salts of a heavy metal with an acid having an acid strength ($-\log pK$) below 5, or chelates of a heavy metal, including chelates which are also salts.

By "heavy metal" is meant one classified as "heavy" in Lange's Handbook of Chemistry, revised 10th Edition, McGraw-Hill Book Co., at pp. 60–61, that is, a metal of Group I–B, II–B, III–B, IV–B, V–B, VI–B, VII–B, or VIII, a metal of Group III–A having an atomic number of at least 13, a metal of Group IV–A having an atomic number of at least 32, or a metal of group VA having an atomic number of at least 51. Preferably the metal is a member of Group I–B, II–B, IV–B, V–B, VI–B, VII–B, or VIII, particularly the first series of such metals, i.e. titanium, vanadium, chromium, manganese, nickel, and especially iron, cobalt, and copper. Suitable salt-forming, non-drying acids are mineral acids, especially hydrochloric, hydrobromic, nitric, sulphuric, phosphorous, and phosphoric acids, and organic acids such as chloracetic, fumaric, maleic, oxalic, salicyclic, and more especially citric acid. Suitable cheltaing agents include those in which the chelating atoms are oxygen and/or nitrogen, for example, 1,2- and 1,3-diketones such as acetylacetone, alkylenediamines such as ethylenediamine, and more particularly, ethylenediaminetetracetic acid.

The fibres and fabrics are preferably treated at a pH greater than 7, typically 7.5 to 12: under acid conditions the polymercaptans tend to cure more slowly.

The amount of catalyst used can vary widely. However, in general from 0.1 to 20%, preferably 1 to 10%, by weight based on the weight of polymercaptan used is required, although much larger quantities can be used.

Curing of the polymercaptan is also assisted by using elevated temperatures and if especially rapid results are required then temperatures in the range 30° to 180° C. may be used. High humidities also tend to accelerate curing in the presence of catalysts.

The polymercaptan, and the catalyst if used, can be applied to the keratinous material in conventional ways. For example, where wool tops or where fabric is to be treated, it may be impregnated by padding or by immersing in a bath. If garments or garment pieces are to be treated then it is convenient to spray them with the polymercaptan, and more convenient still to tumble the garments in a solution or dispersion of the polymercaptan. For the latter method a dry-cleaning machine is a particularly useful apparatus.

If a shrink-resist treatment is required, then it is usually more convenient to apply the polymercaptan to the fabric although, as previously stated, it may be applied to the fibres in the form of tops or card sliver. The fabric may be "flat-set" before or after treatment with the polymercaptan and by this means the fabric will, in addition to retaining substantially its original dimensions, also retain its flat smooth appearance during wear and after washing. It should be stated, however, that flat-setting may not be necessary or even desirable with certain types of cloth. Flat-setting is normally carried out either by treating the cloth with steam at superatmospheric pressure, or by treating the cloth with steam at atmospheric pressure in the presence of a setting agent and moisture and maintaining the cloth in a flat state. Flat-setting may also be achieved by applying high concentrations of a reducing agent and a swelling agent, and maintaining the cloth in a flat state during washing off the excess reagents. In another method flat-setting may be achieved by impregnating the material with a swelling agent and an alkanolamine carbonate, e.g. urea and diethanolamine carbonate, drying the material and then semi-decatising it. Of course, if desired, the fabric may be set in the presence of the polymercaptan, thus effecting setting and shrinkproofing treatment simultaneously.

If a durable press treatment is required, there are a number of ways this may be achieved. One method is to treat the material with the polymercaptan, make the material up into garments or garment pieces and insert therein pleats or creases, using reducing agents, bases, or superheated steam as setting agents. Again, the polymercaptan may be applied to the fibres at any stage during the manufacture of the fabric, e.g. in top form, in yarn, or in fabric form. If desired, agents which block the thiol groups of the wool, e.g. formaldehyde or higher aldehydes, may be applied to the creased or pleated garments after curing the polymercaptan.

A preferred method of applying the polymercaptan to obtain a durable press effect comprises treating the made-up garment piece, which is already in the desired configuration, i.e. has the creases or pleats imparted thereto, with the polymercaptan dissolved in an organic solvent. In this method it is essential that the polymercaptan is applied in an organic solvent because treatment with aqueous systems would only serve to remove the creases or pleats already set in the fabric.

An alternative method comprises impregnating the fabric with the polymercaptan in the area where a fold, such as a crease or pleat, is to be inserted, imparting the desired configuration, and maintaining it in this position whilst heat and pressure are applied.

A further method for flat-setting and shrinkproofing keratinous fabrics comprises treating the fabric with a setting agent and setting it in a flat configuration by heating the fabric while wet, impregnating it with an aqueous emulsion or dispersion of the polymercaptan, and catalyst if required, drying the fabric, and curing the polymercaptan. Finally the fabric is made into garments, and creases or pleats set therein if desired by steaming in the presence of a setting agent such as monoethanolamine sesquisulphite.

The setting of the fabric, whether carried out before or after treatment with the polymercaptan, may be affected using any of the known methods, for example by means of setting agents, e.g. reducing agents, bases, water, and superheated steam. Monoethanolamine sesquisulphite is the most frequently used setting agent and may be used in association with a swelling agent, e.g. urea.

The compositions used in the process of this invention may contain antisoiling, antistatic, bacteriostatic, rotproofing, flameproofing, and wetting agents. They may also contain water-repellents such as paraffin wax, and fluorescent brightening agents.

The invention will now be illustrated by reference to the following examples. Unless otherwise specified, parts and percentages are by weight.

The treated samples of cloth were washed at 40° C. in an English electric Reversomatic washing machine set on programme 5 with the timing control set on No. 1 in an aqueous solution containing, per litre, 2 g. of soap flakes and 0.8 g. of anhydrous sodium carbonate, using a liquor/sample ratio of about 30:1. The samples were removed, rinsed in cold water, spun in the machine, and then dried for 30 minutes in a Parnall tumble drier on full heat. Shrinkage was measured as the difference in dimensions of the fabric before and after washing. Area shrinkage was calculated from linear shrinkage measurements.

The polymercaptan esters used were prepared as follows.

POLYMERCAPTAN A

A mixture of a polyoxypropylene glycol of average molecular weight 1000 (300 g.), mercaptosuccinic acid (30 g.), thioglycollic acid (18.4 g.), toluene-p-sulphonic acid (2.5 g.), and perchloroethylene (300 ml.) was heated to reflux with stirring for 22 hours under nitrogen. Water formed during the reaction was removed as its azeotrope: it measured 10.2 ml. (calculated quantity, 10.8 ml.). The mixture was washed three times with an equal quantity of water, then the solvent was removed by distillation in vacuo. The residue (Polymercaptan A) was a light-coloured liquid of medium viscosity. It weighed 327 g. and had a thiol value of 1.15 equiv./kg. (calculated value, 1.19 equiv./kg.).

Other polymercaptan esters were prepared similarly, as shown in Table I.

TABLE I

| Polymer-captan | Components | | Thiol content (equiv./kg.) | |
|---|---|---|---|---|
| | Substance | Molar ratio | Found | Theory |
| B | Polyoxypropylene glycol average mol. wt. 1,000. | 6 | 0.68 | 0.76 |
| | Mercaptosuccinic acid | 5 | | |
| C | polyoxypropylene glycol average mol. wt. 2,000. | 11 | 0.40 | 0.43 |
| | Mercaptosuccinic acid | 10 | | |
| D | polyoxypropylene glycol average mol. wt. 425. | 11 | 1.65 | 1.72 |
| | Mercaptosuccinic acid | 10 | | |
| E | Butane-1,4-diol | 6 | 3.98 | 4.50 |
| | Mercaptosuccinic acid | 5 | | |
| F | "Comerginol 65" | 2 | 1.79 | 1.81 |
| | Mercaptosuccinic acid | 1 | | |
| | Thioglycollic acid | 2 | | |
| G | Polyoxypropylene triol average mol. wt. 3,000. | 1 | 0.83 | 0.83 |
| | Mercaptosuccinic acid | 3 | | |
| | n-Pentyl alcohol | 3 | | |
| H | Polyoxypropylene glycol average mol. wt. 425. | 11 | 0.93 | 1.00 |
| | Mercaptosuccinic acid | 6 | | |
| | Adipic acid | 4 | | |
| | Acetic acid | 2 | | |

"Comerginol 65" was obtained from Bibby Chemicals Ltd., Liverpool. It has an average molecular weight of about 700, and a hydroxyl value of 155–165. It consists essentially of diprimary alcohols, prepared by catalytic hydrogenation of the methyl esters of long chain aromatic-aliphatic fatty acids, together with, as by-products, small amounts of monohydric and trihydric alcohols.

Example 1

The cloth used was a wool flannel weighing approximately 170 g. per square metre: the pH of its aqueous extract was 3.1. Samples of the flannel were padded with a 3% solution of the polymercaptan ester in perchloroethylene containing 0.3% of monoethanolamine and 5% of ethanol such that the uptake of the polymercaptan was 8% and that of monoethanolamine was correspondingly 0.8%. Then the samples were dried at 50° C. in a fanned oven and stored at room temperature and humidity.

At intervals of from 1 to 22 days after the samples had been impregnated they were washed and dried.

Untreated cloth shrank in area by an average of 22.9%. Results obtained with samples treated in accordance with the method of this invention are shown in Table II.

TABLE II

| Polymercaptan | Area shrinkage, percent after— | | | |
|---|---|---|---|---|
| | 1 day | 2 days | 8 days | 22 days |
| A | 6.0 | 6.3 | 8.7 | 5.3 |
| B | 10.7 | | 12.0 | 8.3 |
| C | 6.5 | 6.3 | 4.0 | 4.5 |
| D | 7.1 | | 5.0 | 6.0 |
| E | 15.5 | 10.3 | 9.7 | 10.7 |
| F | 8.0 | 5.0 | 5.0 | 5.0 |
| G | 6.5 | 5.0 | 5.0 | 4.0 |

Example 2

The method of Example 1 was repeated, but instead of using monoethanolamine, various other catalysts were added, and the uptake of polymercaptan was 3%.

The results are shown in Table III.

TABLE III

| Poly-mer-captan | Catalyst | Percent uptake of catalyst | Area shrinkage, percent after— | | | |
|---|---|---|---|---|---|---|
| | | | 1 day | 2 days | 8 days | 22 days |
| A | Diisopropyl xanthogen disulphide. | 0.3 | 5.9 | 11.2 | 6.4 | |
| | Diethylenetriamine | 0.06 | 5.4 | 9.3 | 5.9 | 6.9 |
| | Diethylenetriamine [1] | 0.16 | 6.9 | 6.9 | 3.0 | |
| | Dipentamethylene thiuram tetrasulphide. | 0.3 | 10.2 | 12.1 | 6.9 | |
| | 2-mercaptobenzothiazole. | 0.3 | 10.7 | 9.8 | 7.4 | |
| | Copper naphthenate | 0.06 | 6.9 | 6.9 | 4.0 | |
| C | N,N'-diethylthiourea | 0.3 | 8.4 | 7.4 | 7.9 | |
| | Tetramethylthiuram disulphide. | 0.3 | 16.4 | 16.8 | 12.2 | |
| G | Diisopropyl xanthogen disulphide. | 0.3 | 6.9 | 8.8 | 6.4 | |
| | Diethylenetriamine | 0.96 | 7.4 | 8.3 | 4.8 | |
| | Diethylenetriamine [1] | 0.16 | 18.6 | 12.6 | 4.0 | 5.9 |
| | Dipentamethylene thiuram tetrasulphide. | 0.3 | 16.7 | 16.3 | 7.9 | |
| | 2-mercaptobenzothiazole. | 0.3 | 10.3 | 7.4 | 4.9 | |
| | Copper naphthenate | 0.06 | 12.1 | 9.3 | 4.5 | |

[1] These mixtures also contained sufficient bisphenol A diglycidyl ether to give a 1.0% uptake.

Example 3

Emulsions were prepared by dissolving sodium carboxymethyl cellulose (0.5 g.) in water (44.5 g.) heated at 70°–80° C., allowing the solutions to cool, adding 50 g. of polymercaptan and an anionic emulsifying agent (5 g.), and stirring with a high-speed stirrer for 5 minutes. (The anionic emulsifying agent was an adduct of 1 mol. of a mixture of $C_{16}$–$C_{18}$ N-alkyl primary amines and 70 ml. of ethylene oxide.)

6 g. portions of these emulsions were diluted with 144 g. water and mixed with 0.3 g. of monoethanolamine, 0.3 g. of sodium dibutyldithiocarbamate or 0.3 g. of piperidinium pentamethylenedithiocarbamate. The diluted emulsions were then padded onto samples of wool flannel so that the take-up of the polymercaptan was 3% and that of the catalysts was 0.3%. The area shrinkage of the wool flannel was obtained as described above and the results are given in Table IV.

TABLE IV

| Polymercaptan | Catalyst | Area shrinkage, percent after— | | | |
|---|---|---|---|---|---|
| | | 1 day | 2 days | 8 days | 22 days |
| A | Monoethanolamine | 4.9 | 3.5 | 5.9 | 3.5 |
| | Sodium dibutyldithiocarbamate | 6.4 | 3.5 | 5.4 | 3.0 |
| | Piperidinium pentamethylene-dithiocarbamate | 10.2 | 7.4 | 9.3 | 6.4 |
| G | Monoethanolamine | 5.0 | 2.0 | 4.5 | 3.5 |
| | Sodium dibutyldithiocarbamate | 4.9 | 3.0 | 4.5 | 3.5 |
| | Piperidinium pentamethylene-dithiocarbamate | 4.0 | 0.0 | 5.9 | 3.0 |

Example 4

Wool flannel was simultaneously set and shrinkproofed by padding with an aqueous mixture containing, per litre, 85 g. of an emulsion of Polymercaptan A or Polymercaptan G, prepared as described in Example 3, 20 g. of monoethanolamine, and 29 g. of 70% aqueous monoethanolamine sesquisulphite, to an uptake of 70% and steaming wet for 2½ minutes, either flat or with a crease inserted. On being washed, the treated flannel retained its crease and its smooth neat appearance while untreated flannel did not. Shrinkage results on the treated samples are given in Table V.

TABLE V

| Polymercaptan | Area shrinkage, percent after— | | | |
|---|---|---|---|---|
| | 1 day | 2 days | 8 days | 22 days |
| A | 9.8 | 6.9 | 9.8 | 6.4 |
| G | 8.8 | 4.5 | 8.3 | 4.9 |

Example 5

Wool flannel was treated with an aqueous solution containing 29 g. per litre of 70% monoethanolamine sesquisulphite and 20 g. per litre of monoethanolamine so that the uptake was 70%. Samples were then steamed wet for 2½ minutes, either flat or with a crease inserted. They were then impregnated to 300% uptake with perchlorethylene containing 0.02% diethylenetriamine and 1% of Polymercaptan A or Polymercaptan G, and dried in an oven at 70° C. for 10 minutes. Samples which had been flat-set were sprayed with the aqueous solution of monoethanolamine and monoethanolamine sesquisulphite used above, and were steamed wet for 2½ minutes to insert a crease. The samples were washed after 1, 2, and 8 days, and in every case crease-retention was very good. The area shrinkages were 5.4, 6.4, and 4.0% for samples treated with Polymercaptan A, and 8.8, 7.9, and 4.5% for those treated with Polymercaptan G.

Example 6

Wool flannel was padded with a 3% solution of Polymercaptan H in perchloroethylene containing 0.06% diethylenetriamine and 5% ethanol such that the uptake of the polymercaptan was 8%. The samples were dried, stored and washed as described in Example 1. The area shrinkage after 1, 2, and 8 days was 6.4%, 7.4% and 4.5% respectively.

Example 7

The process of Example 3 was repeated but the catalysts used were ferric nitrate nonahydrate and anhydrous cupric sulphate, such that the take-up of metal salt was 0.015%.

The shrinkage resistance of the wool flannel was obtained by washing and the results are given in Table VI.

TABLE VI

| Polymercaptan | Catalyst | Area shrinkage, percent after— | |
|---|---|---|---|
| | | 1 day | 2 days |
| A | Ferric nitrate | 10.2 | 9.8 |
| | Cupric sulphate | 8.8 | 6.4 |
| G | Ferric nitrate | 10.2 | 11.7 |
| | Cupric sulphate | 10.7 | 8.8 |

We claim:
1. A process for modifying keratinous material which comprises
  (1) treating the material with an ester having an average molecular weight of at least 400 and at most 40,000, containing at least two mercaptan (—SH) groups per molecule and obtainable by esterification of
    (a) a monomercaptodicarboxylic acid of formula

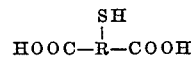

where R represents a trivalent group selected from saturated aliphatic and saturated cycloaliphatic containing at most 8 carbon atoms,
  with
    (b) a polyhydric alcohol of formula $R^4(OH)_{(p+q)}$ where $R^4$ represents a group selected from saturated aliphatic and saturated aliphatic interrupted by ether oxygen, and $(p+q)$ represents an integer of at least two and at most six, and
  (2) curing the said ester on the material.
2. Process according to claim 1, wherein the ester is one obtainable by esterification of
  (a) a monomercaptodicarboxylic acid as aforesaid,
  (d) a polyhydric alcohol as aforesaid,
  and a compound chosen from the class comprising
  (e) a dicarboxylic acid which is free from mercaptan groups and has the formula HOOC—$R^2$—COOH, where $R^2$ represents a divalent residue chosen from aliphatic, aryl and saturated cycloaliphatic containing up to 8 carbon atoms,
  (f) a monocarboxylic acid of formula $R^5$COOH, and
  (g) a monohydric alcohol of formula $R^5$OH,
    where $R^5$ stands for a group selected from the class consisting of alkyl, mercaptoalkyl, alkoxyalkyl, aryl, and cycloalkyl groups.
3. Process according to claim 1, in which there is used from 0.5 to 15% by weight of the said ester based on the weight of the keratinous material treated.
4. Process according to claim 1, in which the treated keratinous material is heated to a temperature in the range 30° to 180° C. to cure the said ester.
5. Process according to claim 1, in which the keratinous fibres are treated with the said ester at a pH of from 7.5 to 12.
6. Process according to claim 1, wherein a catalyst for curing the said ester is also applied, said catalyst being selected from the group comprising bases, siccatives, oxidative curing agents, free-radical catalysts, sulphur, mercaptobenzothiazoles, dithiocarbamates, thiuram sulphides, thioureas, dialkyl disulphides, dicycloalkyl disulphides, diaralkyl disulphides, alkyl xanthogen disulphides, alkyl xanthates, salts of heavy metals with acids having an acid strength below 5, and chelates of heavy metals.
7. Keratinous material bearing thereon an ester having an average molecular weight of at least 400 and at most 40,000, containing at least two mercaptan (—SH) groups per molecule and obtainable by esterification of
  (a) a monomercaptodicarboxylic acid of formula

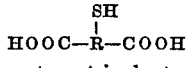

where R represents a trivalent group selected from aliphatic and alicyclic residues, with (d) a polyhydric alcohol of formula $R^4(OH)_{(p+q)}$ where $R^4$ represents a group selected from aliphatic and alicyclic residues, and $(p+q)$ represents an integer of at least two and at most six, in the cured or still curable state.

References Cited

UNITED STATES PATENTS

| | | | |
|---|---|---|---|
| 2,456,314 | 12/1948 | Pratt | 260—75 S |
| 2,461,920 | 2/1949 | Pratt | 260—75 S |
| 2,924,585 | 2/1960 | Schmitz | 260—75 S |
| 2,719,813 | 10/1955 | Haefele | 260—127.3 |
| 3,078,138 | 2/1963 | Miller et al. | 8—127.5 |
| 3,230,144 | 1/1968 | Jensen et al. | 8—127.5 |
| 3,301,700 | 1/1967 | Maloney | 8—127.5 |
| 3,399,682 | 9/1968 | Isain et al. | 8—127.5 |
| 3,459,198 | 8/1969 | Fenlin et al. | 8—127.5 |
| 3,466,136 | 9/1969 | Wasley et al. | 8—127.5 |

GEORGE F. LESMES, Primary Examiner

J. P. BRAMMER, Assistant Examiner

U.S. Cl. X.R.

8—112, 115.7, 127.5, DIG. 8; 117—139.4, 141, 161 K, 161 KP, 161 LM; 260—75 S, 76, 77